Figure 1:
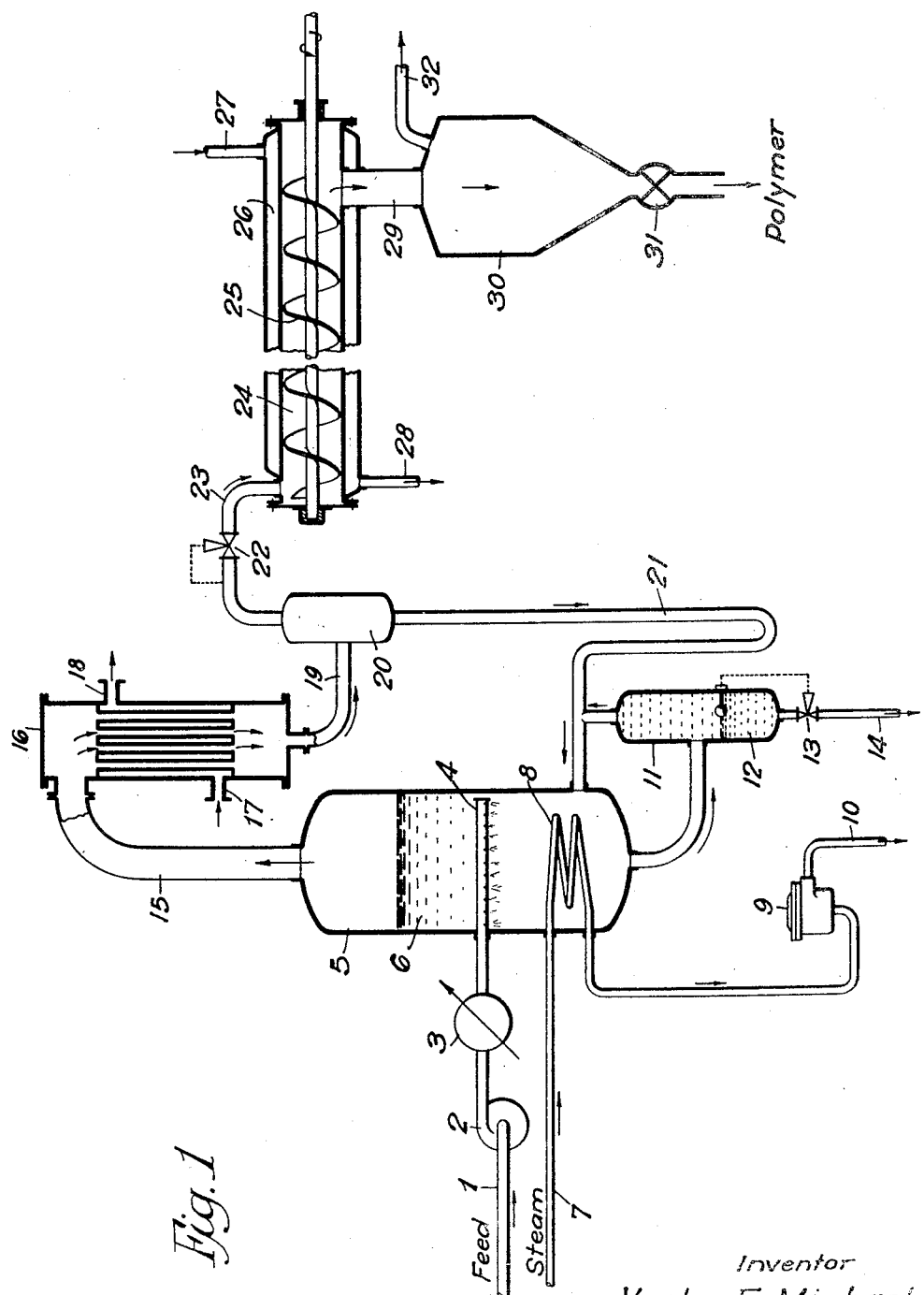

Inventor
Vesta F. Michael

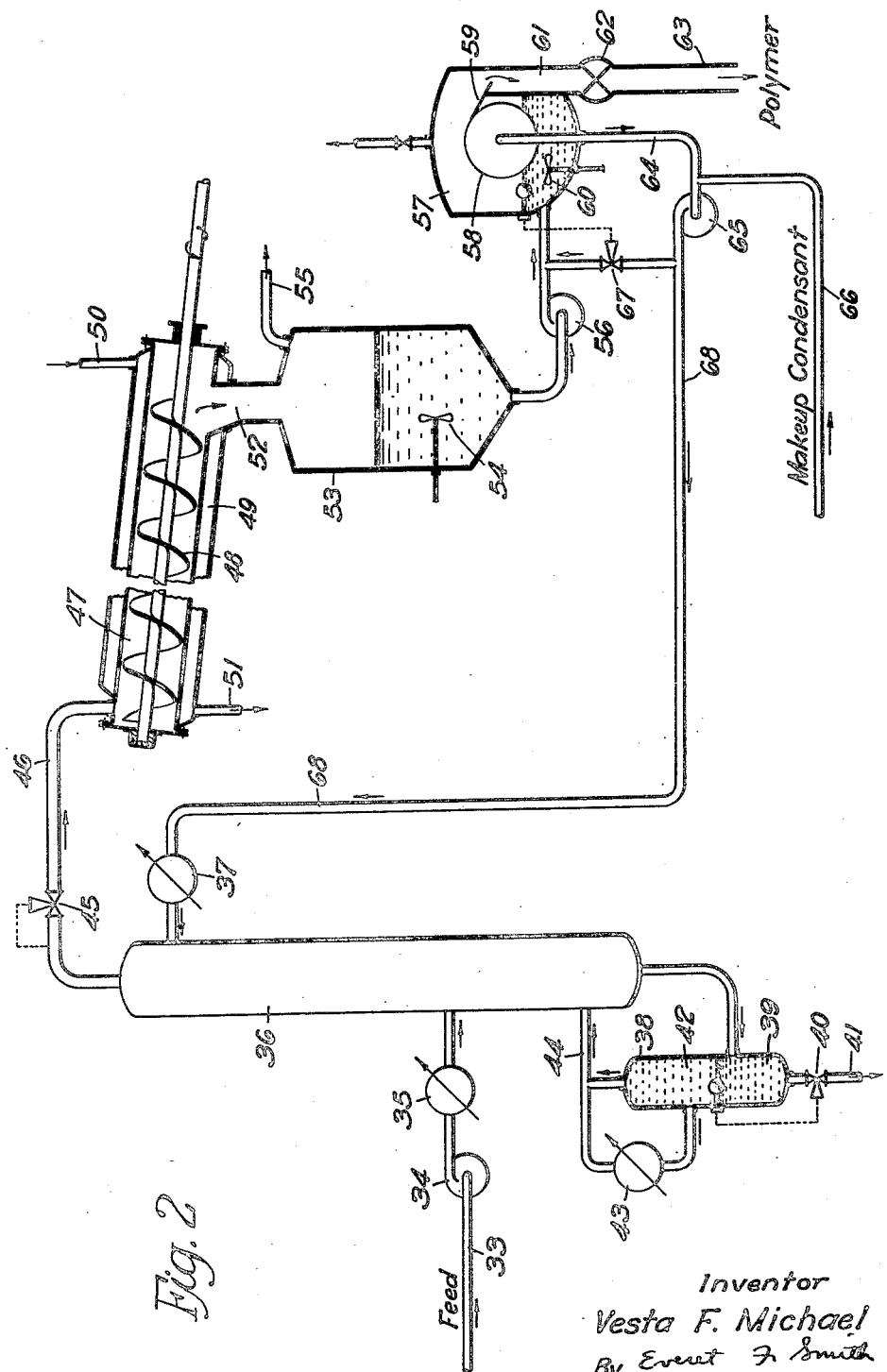

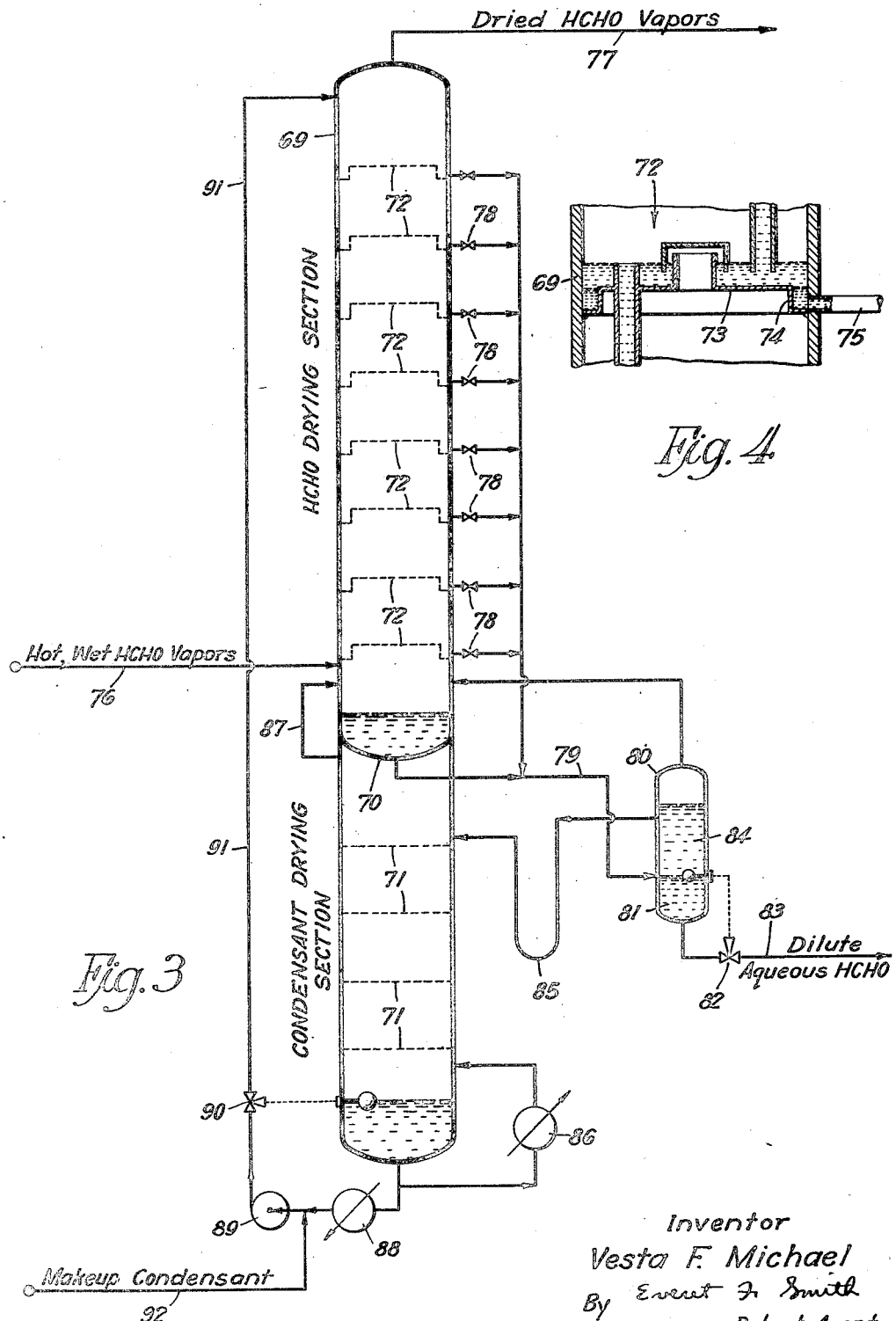

Patented Nov. 14, 1950

2,529,622

UNITED STATES PATENT OFFICE 2,529,622

FORMALDEHYDE PURIFICATION AND POLYMERIZATION WITH SELECTIVE CONDENSATION OF WATER VAPOR

Vesta F. Michael, Tulsa, Okla., assignor to Stanolind Oil and Gas Company, Tulsa, Okla., a corporation of Delaware Application May 22, 1947, Serial No. 749,860

15 Claims. (Cl. 260—340)

This invention relates to the concentration and purification of formaldehyde, and more particularly to the preparation of formaldehyde polymers from mixtures comprising formaldehyde and water.

My invention broadly comprises the selective condensation of water from a vapor stream containing water and monomeric formaldehyde by contacting the said mixture with an inert, water-immiscible liquid at a temperature below the dew point of the vapor stream, separating a condensed water phase, withdrawing an effluent vapor stream containing a diminished concentration of water and optionally further cooling the effluent vapors to cause the separation of solid polymeric formaldehyde therefrom.

Various methods are described in the prior art for purifying, concentrating, and polymerizing formaldehyde. Simple distillation of an aqueous solution of formaldehyde, for example, serves to remove water therefrom, owing to the fact that formaldehyde in aqueous solution is hydrated and partially polymerized to methylene glycol and polyoxymethylene glycols, and tends therefore to boil considerably higher than water. Such a distillation produces an excessive degree of polymerization, however, and results in a waxy product which is relatively insoluble in water and which retains a substantial proportion of water even when efforts are made to dry it under high vacuum. Vacuum distillation of aqueous formaldehyde solutions similarly gives poor results in the separation of water from the hydrated polymer. Pressure distillation has been proposed because of the relatively greater partial pressure of formaldehyde when the aqueous solution is heated under pressure. The method is objectionable, however, because of the tendency of aqueous formaldehyde to undergo the Cannizzaro reaction, giving methanol and formic acid, when the aqueous solution is subjected to elevated temperatures for any substantial length of time.

I have now discovered a method for purifying and concentrating formaldehyde which avoids the difficulties of the prior art. In my process, a vaporous stream of water and monomeric formaldehyde is contacted with a suitable condensant liquid, said condensant liquid being immiscible with water, substantially unreactive under the conditions employed, and preferably a non-solvent for formaldehyde. By a suitable adjustment of temperature and pressure, I find that the water in the entering vapor stream may be condensed substantially to any desired degree of completion; and owing to the fact that the condensation is carried out rapidly, the formaldehyde has little opportunity to undergo either hydration or the Cannizzaro reaction. After the selective condensation of the water, I then ordinarily cool the effluent formaldehyde stream to bring about the formation of a polymeric product having good mechanical properties and high water solubility.

An object of my invention is to provide a superior means for purifying and concentrating formaldehyde. Another object of my invention is to provide a method for selectively removing water from mixtures comprising formaldehyde and water. A further object of my invention is to prepare a polymeric form of formaldehyde having desirable mechanical properties and high water solubility. Other objects and advantages over the prior art will be apparent from the following detailed description and from the claims.

In carrying out my invention, I may utilize virtually any vaporous mixture comprising a substantial proportion of water and monomeric formaldehyde. For example, I may use the vaporous reaction product resulting from the oxidation of methanol with air over a copper catalyst. Alternatively, I may totally vaporize an aqueous solution of formaldehyde, thereby converting the formaldehyde into the non-hydrated monomeric form. Or I may use the concentrated vapors emerging overhead from a still during the fractionation of dilute aqueous solutions of formaldehyde under pressure. Or I may vaporize an aqueous solution of formaldehyde of substantially any concentration, but preferably containing between about 5 and 50% by weight of formaldehyde. For example, I may use the so-called formalin of commerce, which ordinarily contains around 36% of formaldehyde. In all cases, where the charging stock contains any substantial quantity of a material other than formaldehyde boiling below water, such as methanol, I have found it desirable to conduct a preliminary fractional distillation to separate the lower-boiling impurity.

The stream of vaporized water and monomeric formaldehyde is passed into a suitable vessel, where it is contacted with a condensant liquid at a temperature below the dew point of the vapor stream, at least a portion of the water being condensed thereby. The condensant liquid should be water-immiscible, non-reactive with water and formaldehyde, (inert) and preferably a non-solvent for formaldehyde. Among such liquids may be mentioned hydrocarbons, such as pentanes, hexanes, octanes, and the like; aromatic hydrocarbons, such as toluene, xylene, p-cymene, and the like; chlorinated hydrocarbons, such as chloroform, carbon tetrachloride, and the like; ethers, such as ethyl ether, isopropyl ether, butyl ether, and the like; and esters, such as ethyl acetate, butyl acetate, methyl butyrate, and the like. I prefer to use a condensant liquid that is lighter than water, so that the condensed water will settle to the bottom of the reaction vessel, from which it may conveniently be removed. It will be apparent, however, that the condensant utilized in my process need not be restricted to such liquids.

One of the advantages of my process is the rapid condensation of water from the vaporized charging stock, so that there is little opportunity for hydration of the formaldehyde vapors or for their solution in the condensed water. In carrying out my process, I ordinarily prefer to operate at a temperature above about 80° C., in order to minimize the tendency of the formaldehyde to polymerize within the condensation vessel, but below the boiling point of the condensant liquid under the conditions existing in the condensation vessel, in order to maintain a liquid condensant phase; and I also prefer to operate under such conditions as will give an overhead vaporous product containing less than about 5% water, from which a polymer of highest quality may then be prepared. The temperature and maximum percentage of water having been chosen, the choice of the condensant liquid automatically determines the pressure range at which the process will have to be operated, and vice versa. Preferably, however, I choose conditions which will permit operation at ordinary or moderately elevated pressures, for example, up to around 200 pounds per square inch, gage.

In an especially advantageous modification of my process, I pass the vaporized feed stock upward through a plate or packed column countercurrent to a stream of condensant liquid, a temperature gradient being thereby set up, with the lowest temperature near the top of the column, where the concentration of water is lowest. In this modification, the wet formaldehyde vapors are contacted with increments of condensant liquid having progressively lower temperatures, and water is thereby progressively condensed from the vapors. In a further modification of the above process, a plate column is employed, having plates of special design to provide for segregating the condensed water phase, as disclosed in Figure 4 of the attached drawings.

The contact of the monomeric formaldehyde with water is thereby held to a minimum, and the opportunity of the formaldehyde to dissolve in the condensed water and to become hydrated is correspondingly diminished.

The formaldehyde vapors emerging from the top of the condensation vessel may be cooled in a chamber of suitable design to bring about the formation of solid, polymeric formaldehyde. For this purpose, a jacketed tube equipped with a screw conveyor is suitable; or chilled rollers equipped with scrapers; or a tube, preferably vertical, into which a spray of cold condensant liquid is introduced to bring about the polymerization and to wash the polymer from the walls. The polymer may thus be removed from the polymerization equipment in the form of a substantially dry powder, or as a slurry in the condensant liquid. In the latter case, the polymer may be separated by filtration or centrifugation in suitable equipment.

My invention may be more clearly understood from the following examples.

EXAMPLE I (Figure 1)

An aqueous solution of formaldehyde flows through line 1 and pump 2 into vaporizer 3, and the resulting vapors are introduced through sparger tube 4 into condensation vessel 5, where they are contacted with condensant liquid 6. The temperature of the condensant liquid is maintained at the desired level by introducing hot water or steam through line 7 into coil 8, from which the water or condensate passes to trap 9 and out through line 10. A portion of the water in the feed stock condenses and flows out of the bottom of the condensation vessel into separator 11, where it forms a separate phase 12, and is withdrawn through level-control valve 13 and line 14.

Formaldehyde vapors pass out of the top of condensation vessel 5 through line 15 into condenser 16. Water or other liquid of suitably regulated temperature enters the condenser through line 17 and exits through line 18. By adjustment of the condenser temperature, the concentration of condensant liquid in the formaldehyde stream may be reduced to as low a level as desired. The condensate and the formaldehyde vapors emerge through line 19 into reflux bottle 20, from which the condensate flows through seal 21 back to condensation vessel 5, while the formaldehyde vapors flow through pressure-reducing valve 22 and line 23 into polymerization vessel 24.

Polymerization vessel 24 is a cylinder equipped with a screw conveyor 25, a jacket 26, a coolant inlet 27, a coolant exit 28, and an outlet 29. The formaldehyde vapors polymerize on being cooled within vessel 24, and the polymer is conveyed through the cylinder to exit 29, from which it passes into collector 30, and out through star valve 31 into a suitable container. The polymer may then be transferred into additional equipment, not shown, for further drying if desired, or it may be packaged at once.

Collector 30 is vented through line 32, suitably to a water scrubber of conventional design, for recovery of any unpolymerized formaldehyde.

When 103 parts by weight of aqueous 37% formaldehyde solution were vaporized and contacted substantially as described above with ethyl acetate at 70° C. and 1 atmosphere, 9.4 parts by weight of product containing a minor proportion of water were obtained.

In a similar experiment at approximately 69° C. and 1 atmosphere with hexane as the condensant liquid, 97 parts by weight of aqueous 37% formaldehyde solution gave 6.2 parts by weight of product. At approximately 98° C. and 1 atmosphere, heptane gave 6.2 parts by weight of product from 91 parts by weight of the aqueous solution. Between 82 and 85° C. at 1 atmosphere, octane gave 7.7 parts by weight of product from 104 parts by weight of the aqueous solution.

EXAMPLE II (Figure 2)

An aqueous solution of formaldehyde flows through line 33 and pump 34 into vaporizer 35, where it is totally vaporized, and the vapors are introduced at an intermediate point into column 36, which may be a packed column or a plate column equipped with bubble caps. A stream of condensant liquid is adjusted to the desired temperature in heat exchanger 37, and is then introduced into the top of column 36. As the condensant liquid flows downward, it meets the rising stream of aqueous formaldehyde vapors, and condenses at least a portion of the water therefrom.

The bottoms from column 36 flow into separator 38 from which the aqueous phase 39, containing a minor proportion of formaldehyde, is withdrawn through level-control valve 40 and line 41. The condensant-liquid layer 42 from separator 38 passes through reboiler 43, and the vapors are introduced through line 44 into the bottom of column 36.

From the top of column 36 emerges a vapor stream comprising condensant liquid and formaldehyde vapors containing a diminished concentration of water. This mixture flows through pressure-reducing valve 45 and line 46 into polymerization vessel 47.

Polymerization vessel 47 comprises an elongated cylinder equipped with a screw conveyor 48, a cooling jacket 49, a cooling-liquid inlet 50, a cooling-liquid outlet 51, and a product outlet 52. The vapors from column 36 are cooled in polymerization vessel 47, and the formaldehyde vapors are converted thereby into formaldehyde polymer. The resulting mixture of solid and liquid flows out of product outlet 52 into slurry-tank 53, equipped with agitator 54 and vent-line 55.

The slurry is transferred from slurry-tank 53 by pump 56 into pressure filter 57, comprising filter drum 58, scraper 59, agitator 60, product outlet line 61, and star valve 62. The polymer adhering to the surface of drum 58 is separated by scraper 59 and is discharged through line 61, star valve 62, and line 63. The polymer may then be further dried, as for example in a rotary kiln or a vacuum oven, before being used.

The filtrate from drum 58 flows through line 64 into pump 65, where makeup condensant liquid is added through line 66. Under certain operating conditions the filtrate in line 64 will contain an aqueous phase which will be a concentrated purified solution of formaldehyde. This phase can be separated in a suitable settling chamber (not shown) and withdrawn to storage, or recycled to feed line 33. The discharge from pump 66 is divided, part of it returning through valve 67 to filter 57 to maintain the level therein, and part of it going through line 68 and heat exchanger 37 into the top of column 36.

The polymerization chamber as illustrated slopes downward toward the exit end. The chamber may also be constructed horizontally, or the slope may be in the other direction. In the latter case, a liquid level would be maintained within the polymerization vessel, and a slurry would be discharged from exit 52 by the screw conveyor.

EXAMPLE III (Figures 3 and 4)

In Figure 3, column 69 is a fractionating still which is divided into two sections by blind flange 70. The lower section is provided with conventional bubble-cap plates 71, and the upper section is provided with decanter plates 72, illustrated in Figure 4. Decanter plate 72 comprises a conventional bubble-cap plate 73 with a ring-type depression 74 around its periphery to receive the heavier of two liquid phases and to permit its being drained off from the plate and out of the column through line 75.

Hot, wet formaldehyde vapors are introduced through line 76 into column 69, where they flow upward countercurrent to a downward-flowing stream of a condensant liquid, such as pentane, of regulated temperature. Fractional condensation of water takes place on the decanter plates 72, and the formaldehyde vapors are cooled substantially to the temperature of the entering condensant during their passage upward through the column. A stream of dried formaldehyde vapors emerges at the top of the column through line 77, and is then subjected to further processing, such as polymerization or solution in water.

From each of the decanter plates 72, the condensed aqueous phase is withdrawn through line 75 and valve 78, generally in combination with at least a small quantity of condensant. The withdrawn material is combined with the bottoms from the lowest decanter plate and allowed to flow through line 79 into decanter 80. From decanter 80, the lower layer 81, consisting of a dilute formaldehyde solution in water, is withdrawn through phase-level control valve 82 and line 83 to further processing, suitably a partial concentration step, carried out by falling-film evaporation under pressure. The upper layer 84, consisting of condensant with minor proportions of dissolved and entrained water and formaldehyde, overflows through seal line 85 into the top of the lower section of column 69. Condensant vapors from reboiler 86 strip water and formaldehyde out of the condensant as the latter flows downward through conventional bubble-cap plates 71. Wet condensant vapors from the upper portion of this section of the column flow through line 87 into the bottom of the upper section of the column. Dry condensant from the bottom of the lower section of column 69 flows through cooler 88 and is recycled by pump 89 through level-control valve 90 and line 91 to the top of the upper section of column 69. Makeup condensant may be added through line 92 to the intake of pump 89.

The lower the temperature of the condensant entering the top of column 69 through line 91, the greater the degree of drying, and the smaller the proportion of condensant in the effluent formaldehyde vapors. However, the temperature of the condensant is preferably high enough to prevent any substantial degree of polymerization of the formaldehyde within the column. For this reason, I ordinarily prefer to introduce the condensant into the top of column 69 at a temperature of around 80° C. or higher.

Numerous modifications in the mechanical details of my apparatus may be made without departing from the scope of my invention. Column 69, for example, may be split into two separate columns at blind flange 70. Decanter plate 72 may also be modified in various ways. For example, it is not essential that the depression 74 extend around the entire periphery of the plate. The plate might also be built with a downward slope in all directions from the center, and with no ring depression 74 necessarily included at the periphery. In another modification, a well of cylindrical, conical, or other suitable shape might be built into a bubble-cap plate of conventional design. In this embodiment, a slight sloping of the plate toward the well from all directions would be beneficial.

Automatic means may be provided in connection with decanter plates 72 to effect the withdrawal of only the aqueous phase from the liquid on the plates. For example, a small external decanter, with a float-operated valve, may be provided at each plate. A similar valve might be incorporated in the decanting zone of each plate, particularly in decanter plates, described above, having a well for the accumulation of the lower phase. In a particularly convenient modification, a microporous filter, suitably of a ceramic material such as porcelain, is installed in line 15. The filter is saturated with water prior to the introduction of the condensant liquid, and before operation of the equipment is started. Thereafter, the filter will permit only the aqueous phase to pass through and be discharged through line 15.

While the above examples represent the preferred forms of my invention, it will be apparent that numerous modifications may be made without departing from the spirit thereof. In general, it may be said that any modifications or equivalents that would ordinarily occur to those skilled in the art are to be considered as lying within the scope of my invention.

In accordance with the foregoing specification, I claim as my invention:

1. A process for purifying and concentrating formaldehyde which comprises contacting a vaporous stream containing formaldehyde and water with an inert, water-immiscible liquid at a temperature below the dew point of said vaporous stream, and withdrawing a vaporous effluent containing a diminished concentration of water.

2. The process of claim 1 wherein the said vaporous stream contains between about 5 and 50% by weight of formaldehyde, based on the sum of the weights of formaldehyde and water.

3. The process of claim 1 wherein the inert, water-immiscible liquid is an aliphatic ether.

4. A process for purifying and concentrating formaldehyde which comprises contacting a vaporous stream containing formaldehyde and water with a hydrocarbon liquid at a temperature below the dew point of said vaporous stream, and withdrawing a vaporous effluent containing a diminished concentration of water.

5. The process of claim 4 wherein the hydrocarbon liquid is an aliphatic hydrocarbon.

6. The process of claim 4 wherein the hydrocarbon liquid is an aromatic hydrocarbon.

7. A process for purifying and concentrating formaldehyde which comprises contacting a vaporous stream containing formaldehyde and water with an inert, water-immiscible liquid at a pressure between about 0 and 200 pounds per square inch, gage, and at a temperature below the dew point of said vaporous stream, and withdrawing a vaporous effluent containing a diminished concentration of water.

8. A process for purifying and concentrating formaldehyde which comprises contacting a vaporous stream containing formaldehyde and water with an inert, water-immiscible liquid at a temperature above about 80° C. and at a pressure sufficient to cause at least partial condensation of the water in said stream, and withdrawing a vaporous effluent containing a diminished concentration of water.

9. A process for purifying and concentrating formaldehyde which comprises passing a vaporous stream containing formaldehyde and water countercurrent to an inert, water-immiscible liquid at a temperature below the dew point of said vaporous stream, and withdrawing a vaporous effluent containing a diminished concentration of water.

10. A process for purifying and concentrating formaldehyde which comprises passing a vaporous stream containing formaldehyde and water countercurrent to an inert, water-immiscible liquid at a temperature below the dew point of said vaporous stream, withdrawing a vaporous effluent containing a diminished concentration of water, and withdrawing, drying, and recycling said inert, water-immiscible liquid.

11. A process for purifying and concentrating formaldehyde which comprises contacting a vaporous stream containing formaldehyde and water with an inert, water-immiscible liquid in a multiplicity of zones, at least one of which is below the dew point of said vaporous stream, and withdrawing a vaporous effluent containing a diminished concentration of water.

12. A process for purifying and concentrating formaldehyde which comprises contacting a vaporous stream containing formaldehyde and water with an inert, water-immiscible liquid in a multiplicity of zones at successively lower temperatures, at least one of which is below the dew point of said vaporous stream, and withdrawing a vaporous effluent containing a diminished concentration of water.

13. A process for purifying and concentrating formaldehyde which comprises contacting a vaporous stream containing formaldehyde and water with an inert, water-immiscible liquid in a multiplicity of zones at successively lower temperatures, at least one of which is below the dew point of said vaporous stream, withdrawing aqueous condensate from said zones, and withdrawing a vaporous effluent containing a diminished concentration of water.

14. In a process for preparing a formaldehyde polymer which comprises effecting an at least partial dehydration of a vaporous stream containing formaldehyde and water, withdrawing a vaporous effluent containing a diminished proportion of water, cooling said effluent, and separating solid, polymeric formaldehyde therefrom, the improvement which comprises effecting said dehydration by contacting said vaporous stream with an inert, water-immiscible liquid at a temperature below the dew-point of said vaporous stream.

15. In a process for preparing a formaldehyde polymer which comprises effecting an at least partial dehydration of a vaporous stream containing formaldehyde and water, withdrawing a vaporous effluent containing a diminished proportion of water, cooling said effluent, and separating solid, polymeric formaldehyde therefrom, the improvement which comprises effecting said dehydration by contacting said vaporous stream with an inert, water-immiscible liquid at a temperature above about 80° C. and at a pressure such that said temperature is below the dewpoint of said vaporous stream.

VESTA F. MICHAEL.

REFERENCES CITED

The following references are of record in the file of this patent:

UNITED STATES PATENTS

| Number | Name | Date |
|---|---|---|
| 1,677,730 | Sator et al. | July 17, 1928 |
| 1,871,019 | Walker | Aug. 9, 1932 |
| 1,948,069 | Fuchs et al. | Feb. 20, 1934 |
| 2,312,811 | Gentil | Mar. 2, 1943 |
| 2,364,377 | Lawrence | Dec. 5, 1944 |

FOREIGN PATENTS

| Number | Country | Date |
|---|---|---|
| 300,530 | Germany | Dec. 4, 1945 |